(12) United States Patent
Gil et al.

(10) Patent No.: US 10,958,613 B2
(45) Date of Patent: Mar. 23, 2021

(54) SYSTEM AND METHOD FOR IDENTIFYING PAIRS OF RELATED APPLICATION USERS

(71) Applicant: Verint Systems LTD., Herzliya Pituach (IL)

(72) Inventors: Offri Gil, Hod-Hasharon (IL); Pinchas Birenbaum, Rehovot (IL); Yitshak Yishay, Revava (IL)

(73) Assignee: VERINT SYSTEMS LTD., Pituach (IL)

(*) Notice: Subject to any disclaimer, the term of this patent is extended or adjusted under 35 U.S.C. 154(b) by 83 days.

(21) Appl. No.: 16/228,929

(22) Filed: Dec. 21, 2018

(65) Prior Publication Data

US 2019/0215293 A1 Jul. 11, 2019

(30) Foreign Application Priority Data

Jan. 1, 2018 (IL) .......................................... 256690

(51) Int. Cl.
*G06F 15/16* (2006.01)
*H04L 12/58* (2006.01)
(Continued)

(52) U.S. Cl.
CPC ............ *H04L 51/28* (2013.01); *G06K 9/6257* (2013.01); *G06N 20/00* (2019.01); *H04L 51/16* (2013.01)

(58) Field of Classification Search
USPC ......................................................... 709/206
See application file for complete search history.

(56) References Cited

U.S. PATENT DOCUMENTS 5,689,442 A 11/1997 Swanson et al.
6,404,857 B1 6/2002 Blair et al.
(Continued)

FOREIGN PATENT DOCUMENTS

EP 0989499 3/2000
EP 1325655 1/2007
(Continued)

OTHER PUBLICATIONS

Aho, Alfred V., et al., "Efficient String Matching: An Aid to Bibliographic Search," Communication of the ACM, Jun. 1975, vol. 18, No. 6, pp. 333-340.

(Continued)

*Primary Examiner* — Anthony Mejia
(74) *Attorney, Agent, or Firm* — Isus Intellectual Property PLLC; Anthony Jason Mirabito

(57) ABSTRACT

Systems and methods for passive monitoring of computer communication that does not require performing any decryption. A monitoring system receives the traffic exchanged with each relevant application server, and identifies, in the traffic, sequences of messages—or "n-grams"—that appear to belong to a communication session between a pair of users. Subsequently, based on the numbers and types of identified n-grams, the system identifies each pair of users that are likely to be related to one another via the application, in that these users used the application to communicate (actively and/or passively) with one another. The system may identify those sequences of messages that, by virtue of the sizes of the messages in the sequence, and/or other properties of the messages that are readily discernable, indicate a possible user-pair relationship.

16 Claims, 5 Drawing Sheets

(51) Int. Cl.
  *G06N 20/00* (2019.01)
  *G06K 9/62* (2006.01)

(56) References Cited

U.S. PATENT DOCUMENTS

| | | |
|---|---|---|
| 6,718,023 B1 | 4/2004 | Zolotov |
| 6,741,992 B1 | 5/2004 | McFadden |
| 6,757,361 B2 | 6/2004 | Blair et al. |
| 7,134,141 B2 | 11/2006 | Crosbie |
| 7,216,162 B2 | 5/2007 | Amit et al. |
| 7,225,343 B1 | 5/2007 | Honig et al. |
| 7,269,157 B2 | 9/2007 | Klinker et al. |
| 7,287,278 B2 | 10/2007 | Liang |
| 7,466,816 B2 | 12/2008 | Blair |
| RE40,634 E | 2/2009 | Blair et al. |
| 7,587,041 B2 | 9/2009 | Blair |
| 7,650,317 B2 | 1/2010 | Basu et al. |
| 7,769,875 B1 | 8/2010 | Moisand et al. |
| 7,941,827 B2 | 5/2011 | John |
| 8,005,897 B1 | 8/2011 | Roka et al. |
| RE43,103 E | 1/2012 | Rozman et al. |
| 8,176,527 B1 | 5/2012 | Njemanze et al. |
| 8,201,245 B2 | 6/2012 | Dewey et al. |
| RE43,528 E | 7/2012 | Rozman et al. |
| RE43,529 E | 7/2012 | Rozman et al. |
| 8,224,761 B1 | 7/2012 | Rockwood |
| RE43,987 E | 2/2013 | Rozman et al. |
| 8,402,543 B1 | 3/2013 | Ranjan et al. |
| 8,413,244 B1 | 4/2013 | Nachenberg |
| 8,463,855 B2 * | 6/2013 | Adams ................ G06Q 10/107 709/206 |
| 8,499,348 B1 | 7/2013 | Rubin |
| 8,578,493 B1 | 11/2013 | McFadden |
| 8,682,812 B1 | 3/2014 | Ranjan |
| 8,762,948 B1 | 6/2014 | Zaitsev |
| 8,838,951 B1 | 9/2014 | Hicks et al. |
| 8,839,417 B1 | 9/2014 | Jordan |
| 8,850,579 B1 | 9/2014 | Kalinichenko |
| 8,869,268 B1 | 10/2014 | Barger |
| 9,225,829 B2 | 12/2015 | Agúndez Dominguez et al. |
| 9,804,752 B1 * | 10/2017 | Mall ..................... H04L 67/22 |
| 2002/0129140 A1 | 9/2002 | Peled et al. |
| 2003/0097439 A1 | 5/2003 | Strayer et al. |
| 2003/0103461 A1 | 6/2003 | Jorgensen |
| 2005/0018618 A1 | 1/2005 | Mualem et al. |
| 2005/0041590 A1 | 2/2005 | Olakangil et al. |
| 2005/0105712 A1 * | 5/2005 | Williams ............ H04M 3/5166 379/265.02 |
| 2005/0108377 A1 | 5/2005 | Lee et al. |
| 2006/0026680 A1 | 2/2006 | Zakas |
| 2006/0146879 A1 * | 7/2006 | Anthias .................. H04L 69/22 370/471 |
| 2007/0027966 A1 * | 2/2007 | Singhal .................. H04L 29/06 709/220 |
| 2007/0180509 A1 | 8/2007 | Swartz et al. |
| 2007/0186284 A1 | 8/2007 | McConnell |
| 2007/0192863 A1 | 8/2007 | Kapoor et al. |
| 2007/0294768 A1 | 12/2007 | Moskovitch et al. |
| 2008/0014873 A1 | 1/2008 | Krayer et al. |
| 2008/0028463 A1 | 1/2008 | Dagon et al. |
| 2008/0069437 A1 | 3/2008 | Baker |
| 2008/0141376 A1 | 6/2008 | Clausen et al. |
| 2008/0184371 A1 | 7/2008 | Moskovitch et al. |
| 2008/0196104 A1 | 8/2008 | Tuvell et al. |
| 2008/0222127 A1 | 9/2008 | Bergin |
| 2008/0261192 A1 | 10/2008 | Huang et al. |
| 2008/0267403 A1 | 10/2008 | Boult |
| 2008/0285464 A1 | 11/2008 | Katzir |
| 2009/0106842 A1 | 4/2009 | Durie |
| 2009/0150999 A1 | 6/2009 | Dewey et al. |
| 2009/0158430 A1 | 6/2009 | Borders |
| 2009/0216760 A1 | 8/2009 | Bennett |
| 2009/0249484 A1 | 10/2009 | Howard et al. |
| 2009/0271370 A1 | 10/2009 | Jagadish et al. |
| 2009/0282476 A1 | 11/2009 | Nachenberg et al. |
| 2010/0002612 A1 | 1/2010 | Hsu et al. |
| 2010/0037314 A1 | 2/2010 | Perdisci et al. |
| 2010/0061235 A1 | 3/2010 | Pai et al. |
| 2010/0071065 A1 | 3/2010 | Khan et al. |
| 2010/0082751 A1 * | 4/2010 | Meijer ................... G06F 15/16 709/206 |
| 2010/0100949 A1 | 4/2010 | Sonwane |
| 2010/0306185 A1 | 12/2010 | Smith et al. |
| 2011/0099620 A1 | 4/2011 | Stavrou et al. |
| 2011/0154497 A1 | 6/2011 | Bailey |
| 2011/0167494 A1 | 7/2011 | Bowen et al. |
| 2011/0271341 A1 | 11/2011 | Satish et al. |
| 2011/0302653 A1 | 12/2011 | Frantz et al. |
| 2011/0320816 A1 | 12/2011 | Yao et al. |
| 2012/0017281 A1 | 1/2012 | Banerjee |
| 2012/0110677 A1 | 5/2012 | Abendroth et al. |
| 2012/0167221 A1 | 6/2012 | Kang et al. |
| 2012/0174225 A1 | 7/2012 | Shyamsunder et al. |
| 2012/0222117 A1 | 8/2012 | Wong et al. |
| 2012/0304244 A1 | 11/2012 | Xie et al. |
| 2012/0311708 A1 | 12/2012 | Agarwal et al. |
| 2012/0327956 A1 | 12/2012 | Vasudevan |
| 2012/0331556 A1 | 12/2012 | Alperovitch et al. |
| 2013/0014253 A1 | 1/2013 | Neou |
| 2013/0018964 A1 * | 1/2013 | Osipkov ............... G06Q 10/107 709/206 |
| 2013/0096917 A1 | 4/2013 | Edgar et al. |
| 2013/0144915 A1 | 6/2013 | Ravi et al. |
| 2013/0151616 A1 | 6/2013 | Amsterdamski |
| 2013/0191917 A1 | 7/2013 | Warren et al. |
| 2013/0333038 A1 | 12/2013 | Chien |
| 2014/0059216 A1 | 2/2014 | Jerrim |
| 2014/0075557 A1 | 3/2014 | Balabine et al. |
| 2014/0207917 A1 | 7/2014 | Tock et al. |
| 2014/0298469 A1 | 10/2014 | Marion et al. |
| 2015/0055594 A1 * | 2/2015 | Nirantar ............... H04W 72/048 370/329 |
| 2015/0135265 A1 | 5/2015 | Bagrin |
| 2015/0135326 A1 | 5/2015 | Bailey, Jr. |
| 2015/0163187 A1 * | 6/2015 | Nasir .................... H04L 51/043 709/206 |
| 2015/0215429 A1 | 7/2015 | Weisblum et al. |
| 2015/0341297 A1 * | 11/2015 | Barfield, Jr. ............ H04L 51/14 709/206 |
| 2016/0197901 A1 * | 7/2016 | Lester ................... H04L 9/0833 380/283 |
| 2016/0285978 A1 * | 9/2016 | Zlatokrilov .......... H04L 47/2483 |
| 2017/0099240 A1 * | 4/2017 | Evnine .................... H04W 4/21 |
| 2017/0142039 A1 * | 5/2017 | Martinazzi ............. H04L 51/32 |
| 2018/0109542 A1 | 4/2018 | Katzir et al. |
| 2018/0212845 A1 * | 7/2018 | Eriksson ................ H04L 69/22 |
| 2019/0164082 A1 * | 5/2019 | Wu ......................... G06Q 50/01 |
| 2019/0207880 A1 * | 7/2019 | Georgiou ............... H04L 51/04 |
| 2019/0207888 A1 * | 7/2019 | Kasheff ................. H04L 51/12 |
| 2019/0207892 A1 * | 7/2019 | Handte ................... H04L 51/22 |
| 2019/0340945 A1 * | 11/2019 | Malhotra ............... G06N 5/022 |
| 2019/0370854 A1 * | 12/2019 | Gao ....................... H04L 67/22 |
| 2020/0143241 A1 * | 5/2020 | Gao ....................... G06K 9/628 |

FOREIGN PATENT DOCUMENTS

| | | |
|---|---|---|
| EP | 2104044 | 9/2009 |
| EP | 2437477 | 4/2012 |
| WO | 2012/075347 | 6/2012 |

OTHER PUBLICATIONS

Altshuler, Y., et al., "How Many Makes a Crowd? On the Evolution of Learning as a Factor of Community Coverage," LNCS 7227, 2012, pp. 43-52.

Altshuler, Y., et al., "Incremental Learning with Accuracy Prediction of Social and Individual Properties from Mobile-Phone Data," IEEE, 2011, 10 pages.

Altshuler, Y., et al., "Trade-Offs in Social and Behavioral Modeling in Mobile Networks," LNCS 7812, 2013, pp. 412-423.

(56) References Cited

OTHER PUBLICATIONS

Argamon, S., et al., "Automatically Profiling the Author of an Anonymous Text," Communication of the ACM, vol. 52, No. 2, Feb. 2009, pp. 119-123.

Argamon, S., et al., "Gender, Genre, and Writing Style in Formal Written Texts," Text & Talk, vol. 23, Issue 3, 2003, 32 pages.

Atkinson, M., et al., "Near Real Time Information Mining in Multilingual News," World Wide Web Conference, Apr. 20-24, 2009, 2 pages.

Bailey, M., et al., "Automated Classification and Analysis of Internet Malware," Raid, 2007, pp. 178-197.

Bar-Yanai, R., et al., "Realtime Classification for Encrypted Traffic," Lecture Notes in Computer Science, vol. 6049, 2010, pp. 373-385.

Bayer, U., et al., Scalable, Behavior-Based Malware Clustering, Secure Systems Lab, Technical University, Vienna, 2009, 18 pages.

Bilge, Leyla, et al., "EXPOSURE: Finding Malicious Domains Using Passive DNS Analysis," Feb. 2011, 17 pages.

Blum, A., et al., "Combining Labeled and Unlabeled Data with Co-Training," School of Computer Science, Carnegie Mellon University, Proceedings of the Eleventh Annual Conference on Computational Learning theory (COLT'98), 1998, pp. 92-100.

Cloudshield, Inc., "Lawful Intercept Next-Generation Platform," 2009, 6 pages.

Coffman, T., et al., "Graph-Based Technologies for Intelligence Analysis," CACM, Mar. 2004, 12 pages.

Conti, M., et al., "Can't You Hear Me Knocking: Identification of User Action on Android Apps via Traffic Analysis," arXiv.org>cs>arXiv:1407.7844, Cornell University 2014, 8 pages.

Corney, M., et al. "Gender-Preferential Text Mining of E-mail Discourse," Proceedings of the 18the Annual Computer Security Applications Conference, 2002, 8 pages.

De Vel, O., et al., "Language and Gender Author Cohort Analysis of E-mail for Computer Forensics," Defence Science and Technology Organisation, Australia, 2002, 16 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Dietrich, C.J., et al., "CoCoSpot: Clustering and recognizing botnet command and control channels using traffic analysis," 2012, pp. 475-486.

Eagle, N., et al., "Inferring friendship network structure by using mobile phone data," PNAS, vol. 106, No. 36, 2009, pp. 15274-15278.

Eslahi, M., "botAnalytics: Improving HTTP-Based Botnet Detection by Using Network Behavior Analysis system," Dissertation, Faculty of Computer Science and Information Technology, University of Malaya, 2010, 124 pages.

Estival, D., et al., "Author Profiling for English Emails," Proceedings of the 10th Conference of the Pacific Association for Computational Linguistics, 2007, pp. 263-272.

Fisk, Mike, et al., "Applying Fast String Matching to Intrusion Detection," Los Alamos National Laboratory and University of California San Diego, Jun. 1975, 22 pages.

FoxReplay Analyst, Fox Replay BV, http//www.foxreplay.com, Revision 1.0, Nov. 2007, 5 pages.

FoxReplay Analyst Product Brochure, Fox-IT BV, http//www.foxreplay.com, 2006, 2 pages.

Goldfarb, Eithan, "Mass Link Analysis: Conceptual Analysis," Jun. 24, 2007, Version 1.1, 21 pages.

Goswami, S., et al., "Stylometric Analysis of Bloggers' Age and Gender," Proceedings of the Third International ICWSM Conference, 2009, pp. 214-217.

Grolman, E., et al., "Transfer Learning for User Action Identification in Mobile Apps via Encrypted Traffic Analysis," IEEE Intelligent Systems, vol. 33, Issue 2, 2018, pp. 40-53.

Gu, G., et al., "BotMiner: Clustering Analysis of Network Traffic for Protocol- and Structure-Independent Botnet Detection," USENIX Security Symposium, vol. 5, No. 2, XP61009228, 2008, 16 pages.

Gu, G., et al., "BotSniffer: Detecting Botnet Command and Control Channels in Network Traffic," Proceedings of the 15th Annual Network and Distributed System Security Symposium (NDSS'08), San Diego, California, 2008, 18 pages.

Hanneke, S., et al., "Iterative Labeling for Semi-Supervised Learning," Tech. Rep. No. UIUCDCS-R-2004-2442, Computer Science Department, University of Illinois at Urbana-Champaign, 2004, 13 pages.

Jacob, G., et al., "JACKSTRAWS: Picking Command and Control Connections from Bot Traffic," Proceedings of the 20th Usenix Security Symposium, San Francisco, 2011, 16 pages.

Lakhina, A., et al., "Mining Anomalies Using Traffic Feature Distributions," SIGCOMM, 2005, pp. 217-228.

Lin, Z., et al., "Automatic Protocol Format Reverse Engineering through Context-Aware Monitored Execution," Proceedings of the Network and Distributed System Security Symposium, San Diego, California, 2008, 17 pages.

Liu, R-T., et al., "A Fast Pattern-Match Engine for Network Processor-based NIDS," Proceedings of the 20th International Conference on Information Technology (ITCC'04), 2006, 23 pages.

Livadas, C., et al., "Using Machine Learning Techniques to Identify Botnet Traffic," In 2nd IEEE LCN Workshop on Network Security (WoNS'2006), 2006, pp. 967-974.

Mohrehkesh, S., et al., "Demographic Prediction of Mobile User from Phone Usage," Proceedings Mobile Data Challenge by Nokia Workshop, Newcastle, United Kingdom, 2012, 4 pages.

Navarro, Gonzalo, et al., "Flexible Pattern Matching in Strings: Practical On-Line Search Algorithms for Texts and Biological Sequences," Cambridge University Press, 2002, 166 pages.

Netronome SSL Inspector Solution Overview White Paper, "Examining SSL-encrypted Communications," 2010, 8 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Rangel, F., et al., "Overview of the Author Profiling Task at PAN 2013," CLEF 2013 Evaluation Labs, 2013, 13 pages.

Rieck, K., et al., "Botzilla: Detecting the 'Phoning Home' of Malicious Software," Proceedings of the ACM Symposium on Applied Computing (SAC), Sierre, Switzerland, 2010, 7 pages.

Rohde & Schwarz GmbH & Co. KG, "ACCESSNET-T, DMX-500 R2, Digital Mobile eXchange," Product Brochure, Secure Communications, Mar. 2000, 4 pages.

Rohde & Schwarz GmbH & Co. KG, "ACCESSNET-T IP," Product Brochure, Secure Communications, Jan. 2000, 4 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "Integrated Digital Audio Software R&S AllAudio," Specifications, 2000, 8 pages.

Rohde & Schwarz GmbH & Co. KG, "R&S RA-CM Continuous Monitoring Software," Product Brochure, Radiomonitoring & Radiolocation, Jan. 2001, 16 pages.

Rohde & Schwarz GmbH & Co. KG, "R&S RAMON COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

(56) References Cited

OTHER PUBLICATIONS

Saltaformaggio, B., et al., "Eavesdropping on Fine-Grained User Activities Within Smartphone Apps Over Encrypted Network Traffic," Proceedings of the 10$^{th}$ USENIX Conference on Offensive Technologies (WOOT'16), 2016, pp. 69-78.

Schulzrinne, H., et al., "RTP: A Transport Protocol for Real-Time Applications," Standards Track, Jul. 2003, 89 pages.

Sheng, Lei, et al., "A Graph Query Language and Its Query Processing," IEEE, Apr. 1999, pp. 572-581.

Soghoian, Christopher, et al., "Certified Lies: Detecting and Defeating Government Interception Attacks Against SSL," 2010, 19 pages.

Stamatatos, E., "Author identification: Using text sampling to handle the class imbalance problem," Science Direct, Information Processing and Management, vol. 44, 2008, pp. 790-799.

Svenson, Pontus, et al., "Social network analysis and information fusion for anti-terrorism," CIMI, 2006, 8 pages.

Thonnard, O., et al., "Actionable Knowledge Discovery for Threats Intelligence Support Using a Multi-Dimensional Data Mining Methodolgy," 2008 IEEE International Conference on Data Mining Workshops, 2008, pp. 154-163.

Tongaonkar, Alok S., "Fast Pattern-Matching Techniques for Packet Filtering," Stony Brook University, May 2004, 44 pages.

Verint Systems Inc., "Mass Link Analysis: Solution Description," Dec. 2008, 16 pages.

Wang, H., et al., "NetSpy: Automatic Generation of Spyware Signatures for NIDS," Proceedings of the 22$^{nd}$ Annual Computer Security Applications Conference, Miami Beach, Florida, Dec. 2006, ten pages.

Yu, Fang, et al., "Fast and Memory-Efficient Regular Expression Matching for Deep Packet Inspection," ANCS'06, San Jose, California, Dec. 3-5, 2006, 10 pages.

Yu, Fang, et al., "Gigabit Rate Packet Pattern-Matching Using TCAM," Proceedings of the 12th IEEE International Conference on Network Protocols (ICNP'04), 2004, 10 pages.

Zhang, Y., et al., "Detecting Stepping Stones," Proceedings of the 9$^{th}$ USENIX Security Symposium, Denver, Colorado, 2000, 11 pages.

\* cited by examiner

SYSTEM AND METHOD FOR IDENTIFYING PAIRS OF RELATED APPLICATION USERS

FIELD OF THE DISCLOSURE

The present disclosure relates to the monitoring of communication traffic generated by users of computer applications.

BACKGROUND OF THE DISCLOSURE

Various computer applications allow users to exchange communication with each other over a communication network, such as the Internet. Such an exchange may be actively performed, as when one user uses an application to send a text message to another user. Alternatively, such an exchange may be passively performed, as when the device of a first user passes to a second user, via the application server, a status-update message that contains information relating to the status of the first user with respect to the application. For example, upon a given user launching the application, the application may send a message to some or all of the user's contacts, indicating that the user is now "online." (The user may also receive respective status-update messages from the user's contacts.) Subsequently, while the application is running, the application may periodically send the user's contacts additional status-update messages, to notify the contacts that the user remains online. As another example of a passive exchange, upon a first user opening a message from a second user, the first user's device may send a message to the second user, indicating that the message has been opened.

Many computer applications use encrypted protocols, such that the communication traffic exchanged by these applications is encrypted. Examples of such applications include Gmail, Facebook, Twitter, and WhatsApp. Examples of encrypted protocols include the Secure Sockets Layer (SSL) protocol, the Transport Layer Security (TLS) protocol, and proprietary end-to-end encrypted protocols.

US Patent Application Publication 2016/0285978 describes a monitoring system that monitors traffic flows exchanged over a communication network. The system characterizes the flows in terms of their temporal traffic features and uses this characterization to identify communication devices that participate in the same communication session. By identifying the communication devices that serve as endpoints in the same session, the system establishes correlations between the users of these communication devices. The monitoring system characterizes the flows using traffic features such as flow start time, flow end time, inter-burst time and burst size, and/or statistical properties of such features. The system typically generates compressed-form representations ("signatures") for the traffic flows based on the temporal traffic features and finds matching flows by finding similarities between signatures.

SUMMARY OF THE DISCLOSURE

There is provided, in accordance with some embodiments of the present invention, apparatus that includes a network interface and a processor. The processor is configured to receive a volume of communication traffic that includes a plurality of messages, each of which is exchanged between a server for an application and one of a plurality of users. The processor is further configured to identify in the received volume, by scanning the received volume for any message sequence that follows any one of a plurality of predetermined message-sequence patterns, at least one sequence of messages that is exchanged between the server and a particular pair of the users and follows one of the predetermined message sequence patterns. The processor is further configured to, in response to the identifying, calculate a likelihood that the particular pair of the users used the application to communicate with one another, and, in response to the likelihood exceeding a threshold, generate an output that indicates the particular pair of the users.

In some embodiments, the messages are encrypted, and the processor is configured to scan the received volume without decrypting any of the messages. In some embodiments, the processor is configured to scan the received volume for any message sequence that follows any one of the predetermined message-sequence patterns by virtue of a property of the message sequence selected from the group of properties consisting of: respective sizes of messages in the message sequence, respective directionalities of the messages in the message sequence, and respective user-endpoints of the messages in the message sequence.

In some embodiments, the processor is further configured to, prior to scanning the received volume, identify multiple pairs of the users that potentially used the application to communicate with one another, the multiple pairs including the particular pair, by identifying in the volume of traffic, for each pair of the multiple pairs, a plurality of instances in which a first one of the messages destined to a first member of the pair was received within a given time interval of a second one of the messages destined to a second member of the pair, and the processor is configured to scan the received volume for any message sequence exchanged between the server and any one of the identified multiple pairs of the users.

In some embodiments, the processor is configured to identify the sequence in response to the sequence spanning a time interval that is less than a given threshold.

In some embodiments, the given threshold is a function of a number of round trips, between the server and the particular pair of users, that is implied by the sequence. In some embodiments, the processor is configured to identify a plurality of sequences that collectively follow a plurality of different ones of the predetermined message-sequence patterns, and the processor is configured to calculate the likelihood, using a machine-learned model, based at least on respective numbers of the identified sequences following the different ones of the predetermined message-sequence patterns.

In some embodiments, the volume is a first volume, and the processor is further configured to:

identify a plurality of true message sequences, each of which follows any one of the predetermined message-sequence patterns and is assumed to belong to a communication session between any two users, generate a second volume of communication traffic, by intermixing a first sequential series of messages exchanged with the server with a second sequential series of messages exchanged with the server, identify, in the second volume, a plurality of spurious message sequences, each of which follows any one of the predetermined message-sequence patterns and includes at least one message from the first sequential series and at least one message from the second sequential series, and train the model, using both the true message sequences and the spurious message sequences.

In some embodiments, the processor is further configured to, prior to scanning the volume, learn the message-sequence patterns, by identifying a plurality of ground-truth message sequences, each of which follows any one the message-sequence patterns and is assumed to belong to any one of a plurality of communication sessions between one or more other pairs of users.

In some embodiments, the processor is further configured to ascertain that each one of the ground-truth message sequences is assumed to belong to one of the communication sessions, by identifying, for each pair of the other pairs of users, a plurality of instances in which a first message destined to a first member of the pair was received within a given time interval of a second message destined to a second member of the pair.

In some embodiments,
the volume is a first volume,
the processor is further configured to:
generate a second volume of communication traffic, by intermixing a first sequential series of messages exchanged with the server with a second sequential series of messages exchanged with the server, and
identify, in the second volume, a plurality of spurious message sequences, each of which includes at least one message from the first sequential series and at least one message from the second sequential series, and the processor is configured to, in learning the predetermined message-sequence patterns, exclude at least some patterns followed by the spurious message sequences from the predetermined message sequence patterns, in response to identifying the spurious message sequences.

There is further provided, in accordance with some embodiments of the present invention, a method that includes receiving a volume of communication traffic that includes a plurality of messages, each of which is exchanged between a server for an application and one of a plurality of users. The method further includes, by scanning the received volume for any message sequence that follows any one of a plurality of predetermined message-sequence patterns, identifying, in the received volume, at least one sequence of messages that is exchanged between the server and a particular pair of the users, and follows one of the predetermined message-sequence patterns. The method further includes, in response to the identifying, calculating a likelihood that the particular pair of the users used the application to communicate with one another, and, in response to the likelihood exceeding a threshold, generating an output that indicates the particular pair of the users.

There is further provided, in accordance with some embodiments of the present invention, a computer software product including a tangible non-transitory computer-readable medium in which program instructions are stored. The instructions, when read by a processor, cause the processor to receive a volume of communication traffic that includes a plurality of messages, each of which is exchanged between a server for an application and one of a plurality of users. The instructions further cause the processor to identify in the received volume, by scanning the received volume for any message sequence that follows any one of a plurality of predetermined message-sequence patterns, at least one sequence of messages that is exchanged between the server and a particular pair of the users and follows one of the predetermined message-sequence patterns. The instructions further cause the processor to, in response to the identifying, calculate a likelihood that the particular pair of the users used the application to communicate with one another, and, in response to the likelihood exceeding a threshold, generate an output that indicates the particular pair of the users.

The present disclosure will be more fully understood from the following detailed description of embodiments thereof, taken together with the drawings, in which:

DETAILED DESCRIPTION OF EMBODIMENTS

Overview

Figure 1:
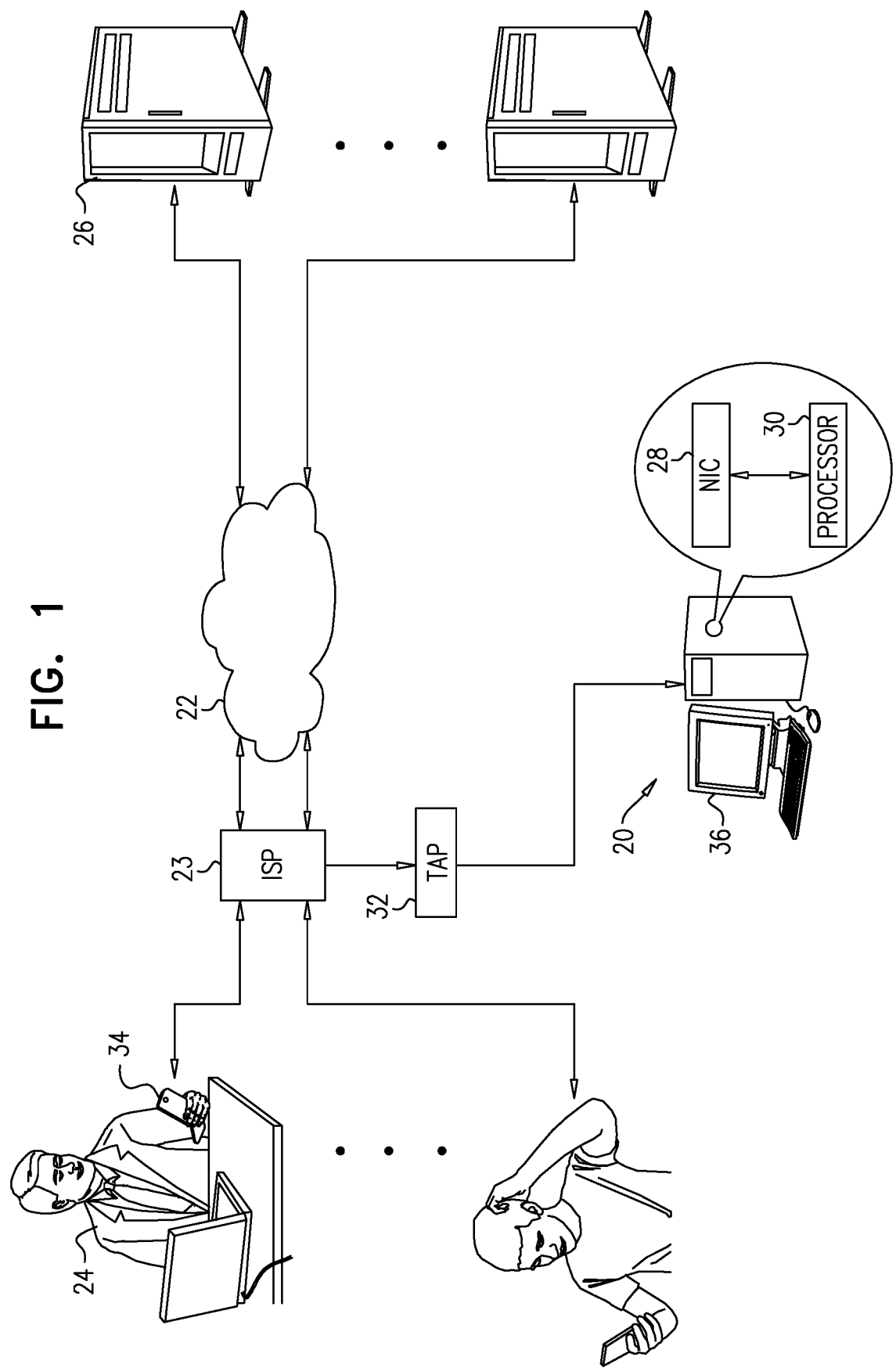
FIG. 1 is a schematic illustration of a system for monitoring communication exchanged over a network, such as the Internet, in accordance with some embodiments of the present disclosure.

In some cases, interested parties may wish to identify relationships between users of computer applications, such as apps that runs on a mobile phone, by monitoring the communication traffic generated by these applications. A challenge in doing so, however, is that the traffic generated by the applications may be encrypted. Moreover, many applications use a server to intermediate communication between users, such that traffic does not flow directly between the users. Furthermore, popular applications, such as WhatsApp, may have hundreds of thousands, or even millions, of active users at any given instant. As yet another challenge, each application of interest may generate different characteristic patterns of traffic.

Embodiments of the present disclosure address these challenges, using a technique that does not require performing any decryption, and that requires only passive monitoring of the communication exchanged with the relevant application servers. In particular, in embodiments described herein, a monitoring system receives the traffic exchanged with each relevant application server, and identifies, in the traffic, sequences of messages—or "n-grams"—that appear to belong to a communication session between a pair of users. Subsequently, based on the numbers and types of identified n-grams, the system identifies each pair of users that are likely to be related to one another via the application, in that these users used the application to communicate (actively and/or passively) with one another.

For example, for a particular messaging application, the monitoring system may identify a sequence of three messages, or a "3-gram," that indicates that the following sequence of events occurred:

(i) A first user sent a text message to the server.
(ii) The server sent a text message to a second user.
(iii) The server sent an acknowledgement message to the first user.

Assuming that the time span of this sequence does not exceed a particular threshold, this sequence suggests possible communication between the first and second users. (Of course, this sequence does not definitively suggest such communication, since it is possible that the text message received by the second user was sent by a third user, rather than by the first user.) Hence, the identification of this sequence may increase the likelihood of a relationship between the first and second users.

Advantageously, the system typically does not need to learn to explicitly identify each type of message that a particular application generates. Rather, the system may identify those sequences of messages that, by virtue of the sizes of the messages in the sequence, and/or other properties of the messages that are readily discernable, indicate a possible user-pair relationship. Thus, for example, the system may identify the aforementioned 3-gram without identifying the first and second messages as text messages, and/or without identifying the third message as an acknowledgement message.

Typically, prior to looking for n-grams in the traffic, the system performs an initial screening, to identify candidate pairs of related users. For example, the system may identify all pairs of users who, in a sufficient number of instances, received messages from the server within a small time interval of one another, such as within 2 MS of one another. (Each such instance is termed an "Rx collision.") The system then looks for n-grams only for the candidate pairs, while ignoring other pairs of users. This screening process generally reduces the time required to identify pairs of related users, without significantly increasing the number of missed related pairs. Hence, even applications having a large number of simultaneously-active users may be handled by the system.

Embodiments of the present disclosure also include techniques for learning the message-sequence patterns that potentially suggest user-pair relatedness, such that the system may subsequently search for n-grams that follow these specific patterns. (These patterns may also be referred to as "n-grams," such that the term "n-gram" may refer either to a message-sequence pattern, or to an actual sequence of messages.) First, the system identifies "ground-truth" pairs of related users, using any suitable external source of information (e.g., contact lists), and/or by applying the above-described screening process to a large volume of communication traffic and identifying those pairs of users having a relatively large number of associated Rx collisions. Subsequently, the system identifies the most common patterns appearing in communication sessions between the pairs of related users.

Embodiments of the present disclosure further include techniques for training a classifier to identify that a particular pair of users is related, based on the numbers and types of n-grams identified for the pair. To train the classifier, the system first records, for each of a plurality of pairs of related users, and for each of the potentially-meaningful patterns that were learned as described above, the number of sequences following the pattern that were identified in a volume of traffic spanning a particular time interval (e.g., 10 minutes). This information is supplied to the classifier in the form of a plurality of "feature vectors," each of which corresponds to a respective pair of related users. Similar feature vectors are generated for a plurality of pairs of unrelated users and are likewise supplied to the classifier. Based on these feature vectors, the classifier learns to differentiate between related and unrelated pairs.

To facilitate generating feature vectors for pairs of unrelated users, the system may mix two separate volumes of traffic with one another, such as to create "spurious" n-grams that each include at least one message from each of the volumes. This mixing technique may be further used in the above-described learning stage, in that the system may identify a given pattern as potentially meaningful only if this pattern is exhibited by the true n-grams with a frequency that is sufficiently greater than the frequency with which the pattern is exhibited by the spurious n-grams.

System Description

Figure 2:
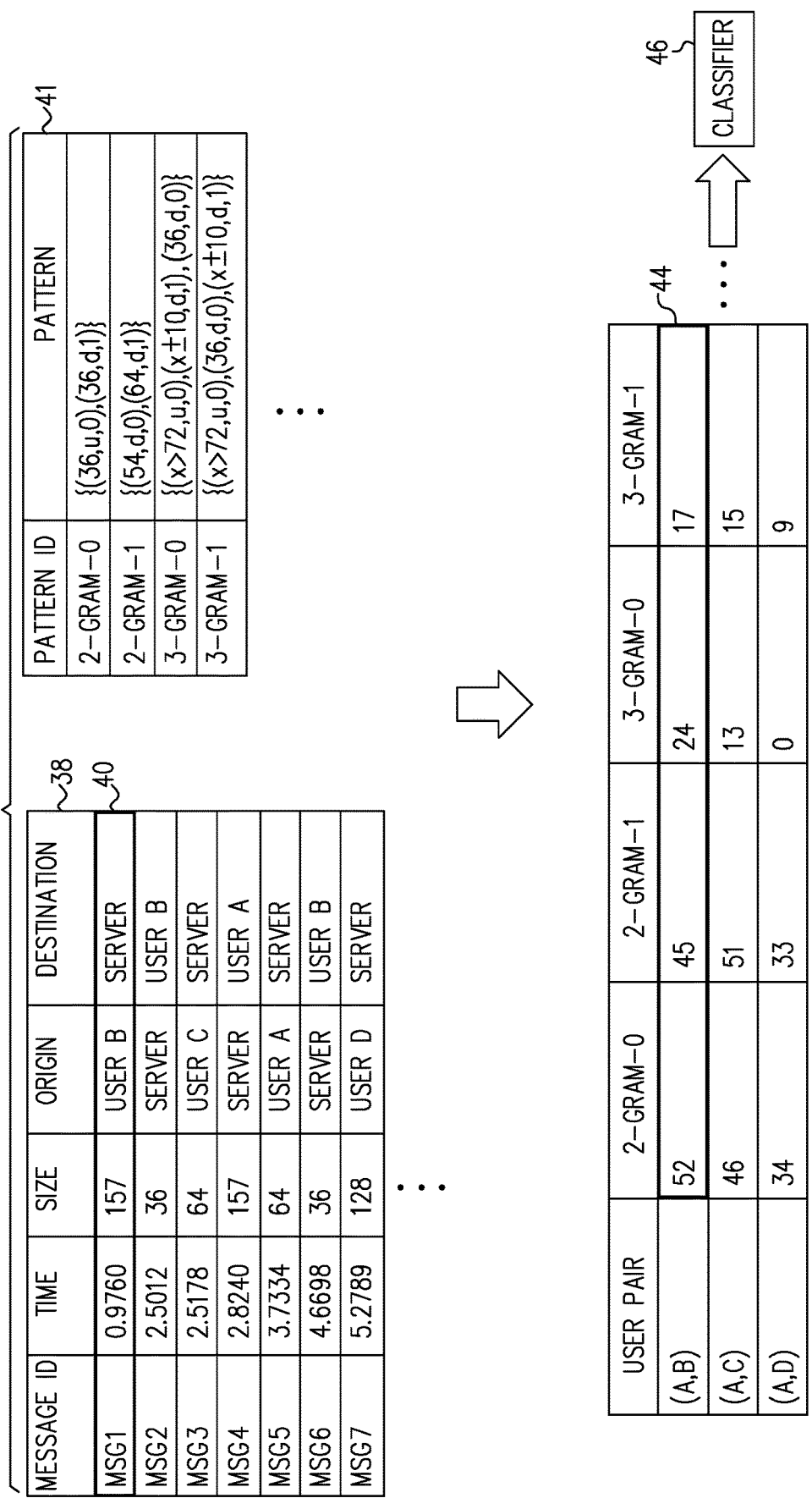
FIG. 2 is a schematic illustration of a technique for identifying pairs of related users, in accordance with some embodiments of the present disclosure.

Reference is initially made to FIG. 1, which is a schematic illustration of a system 20 for monitoring communication exchanged over a network 22, such as the Internet, in accordance with some embodiments of the present disclosure. One function of system 20, described in detail below with reference to FIG. 2, is to identify pairs of users who have each used a particular application to communicate with one another, and hence may be said to be related via the application.

FIG. 1 depicts a plurality of users 24 using computer applications, which may run, for example, on personal computers or mobile devices 34, to communicate with each other over network 22. An example of an application that may be used to exchange communication over network 22 is the WhatsApp application, which allows users to exchange voice communication, text messages, images, and other forms of communication. A plurality of servers 26 service the computer applications, such that communication between users 24 is exchanged via servers 26. (A given server may service more than one application.)

Typically, system 20 passively monitors the communication over network 22, in that the system does not intermediate the exchange of communication traffic between users 24 and servers 26, but rather, receives copies of the traffic from one or more network taps 32. Network taps 32 may be situated at any suitable point in the network; for example, network taps 32 may be situated near one or more Internet Service Providers (ISPs) 23.

The "units" of communication traffic exchanged over network 22 may include, for example, Transmission Control Protocol (TCP) packets, User Datagram Protocol (UDP) packets, or higher-level encapsulations of TCP or UDP packets, such as SSL frames or any encrypted proprietary frames. In some cases, a single unit of traffic corresponds to a single message. (For example, each SSL frame generally corresponds to a single message.) In other cases, a single unit may carry only part of a message or may carry multiple messages. Hence, system 20 is configured to combine or split units of traffic, as necessary, in order to identify the individual messages that underlie the communication. (Typically, in the event that a given message spans more than one packet, the time at which the first or last packet containing at least part of the message was received by the system is used as the receipt time of the message.) System 20 is further configured to identify the sizes of the underlying messages (e.g., by reading any unencrypted headers), and to use these sizes for related-user-pair identification, as described in detail below.

Typically, any given message does not indicate (in an unencrypted form) the application to which the message belongs, the identity of the sender, or the identity of the entity for whom the message is destined. Rather, the message typically specifies only the communication protocol per which the message is constructed, a source Internet Protocol (IP) address and port, and a destination IP address and port. (For downstream messages, the source IP address and port belong to the server, and the destination IP address and port belong to the user for whom the message is destined; for upstream messages, the source IP address and port belong to the sending user, and the destination IP address and port belong to the server.) Notwithstanding this dearth of information, however, system 20 may identify the application to which the message belongs, along with the identity of the "endpoint user" with whom the message was exchanged.

For example, system 20 may identify the application from the source or destination IP address of the server that is contained in the message. For example, in response to identifying the IP address of the WhatsApp server, the system may ascertain that the message was generated from the WhatsApp application. In the event that the server serves multiple applications, system 20 may identify the application from an SSL handshake at the start of the communication session. Alternatively, system 20 may perform all of the techniques described herein even if the system does not know the application to which any given one of the messages belongs, by treating all communication exchanged with the server as belonging to a single application.

The system may further use any suitable technique to identify the endpoint user who sent or received the message. For example, the system may refer to a cellular service provider for a mapping between IP addresses and mobile phone numbers, such that the source or destination IP address may be used to identify the user who sent or received the message. (Such a mapping may be derived, for example, from General Packet Radio Service Tunneling Protocol (GTP) data.) In the event that a user is using a network address translator (NAT), which allows multiple devices to use a single IP address, techniques for discovering the identity of a device behind a NAT, such as any of the techniques described in US Patent Application Publication 2017/0222922, whose disclosure is incorporated herein by reference, may be applied. For example, the system may use one or more device identifiers, such as one or more Internet cookies, to identify the device.

System 20 comprises a network interface 28, such as a network interface controller (NIC), and a processor 30. Intercepted messages from network taps 32 are received by processor 30 via network interface 28. Processor 30 processes the messages as described herein, such as to identify relationships between users 24, or perform any other functions described herein. Further to processing the messages, the processor may generate any suitable output, such as a visual output displayed on a display 36. System 20 may further comprise any suitable input devices, such as a keyboard and/or mouse, to facilitate human interaction with the system.

In general, processor 30 may be embodied as a single processor, or as a cooperatively networked or clustered set of processors. The functionality of processor 30, as described herein, may be implemented in hardware, e.g., using one or more Application-Specific Integrated Circuits (ASICs) or Field-Programmable Gate Arrays (FPGAs). Alternatively, this functionality may be implemented using software, or using a combination of hardware and software elements. For example, processor 30 may be a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the processor in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

N-Gram Identification and Pattern Matching

Reference is now made to FIG. 2, which is a schematic illustration of a technique for identifying pairs of related users, in accordance with some embodiments of the present disclosure.

FIG. 2 shows a volume 38 of communication traffic, which is received by processor 30, via NIC 28, from network taps 32, as described above with reference to FIG. 1. Volume 38 includes a plurality of encrypted messages 40, each of which is exchanged between a server 26 for a particular application (e.g., WhatsApp), and one of users 24. By way of example, FIG. 2 specifies four users: User A, User B, User C, and User D. As described in detail below, by scanning volume 38, processor 30 identifies pairs of users who have a high likelihood of having exchanged communication with one another using the application.

Given that each message 40 is encrypted, processor 30 cannot, typically, inspect the content of the message. However, processor 30 may identify certain features of each message, even without decrypting the message. These features include, in addition to the origin and destination of the message (the identification of which were described above with reference to FIG. 1), the size of the message, and the time at which the message was received by the processor or by the network tap from which the message was received. In FIG. 2, the size of the message is assumed to be in bytes, while the time is assumed to be in milliseconds, relative to some arbitrary starting time. For ease of description, in FIG. 2, each message 40 is assigned an ID, even though such an ID may not be explicitly assigned by the processor.

It is noted that the specific sizes and times shown in FIG. 2 and in the subsequent figures are provided by way of illustration only, and as such, may not reflect realistic patterns of communication or network conditions. For example, the time interval required for a message to travel between a user and an application server is typically much larger than the time intervals implied by FIG. 2 and the subsequent figures.

By scanning volume 38, processor 30 identifies sequences of messages exchanged between the server and various pairs of users, each of these sequences potentially belonging to a communication session between the corresponding pair of users. A sequence is said to be exchanged between the server and a particular pair of users if each message in the sequence is exchanged between the server and either one of the users. For example, FIG. 2 shows a sequence of five messages—namely, MSG1, MSG2, MSG4, MSG5, and MSG6—that potentially belongs to a communication session between User A and User B. For example, this sequence may have been generated by the sending of a text message from User B to User A, whereby:

(i) User B sent a text message (of size 157 bytes), destined for User A, to the server;

(ii) User B received an acknowledgement message (of size 36) from the server, acknowledging receipt of the text message by the server;

(iii) User A received the text message from the server;

(iv) User A sent an acknowledgement message (of size 64) to the server, acknowledging receipt of the text message; and (v) User B received another acknowledgement message (of size 36) from the server, reporting that the text message was received by User A.

(It is noted that the present application may refer to a message as being sent by, received by, or destined to a particular user, even if the user is never explicitly made aware of the message, as long as the message is sent by, received by, or destined to the user's device.)

Typically, processor 30 scans volume 38 for specific predefined message-sequence patterns, contained in a list 41, that are known to potentially indicate a user-pair relationship. (As further described below with reference to FIG. 4, these patterns are typically learned by processor 30, prior to scanning volume 38.) Each pattern in list 41 is typically represented, by processor 30, as an n-gram, in which each of then "words" of the n-gram represents, in canonical form, a different respective message. For example, each word may consist of three "letters," each corresponding to a different respective property of the message: the size of the message, the directionality of the message, and the user endpoint of the message. Likewise, each sequence of messages in volume 38 may be represented in this form. Hence, given list 41, processor 30 may, using any suitable pattern-matching technique (e.g., using a finite automaton), identify sequences of messages in volume 38 that follow the predefined patterns.

For example, the sequence of MSG1, MSG2, MSG4, MSG5, and MSG6 may be represented as the following 5-gram: {(157, u, 0), (36, d, 0), (157, d, 1), (64, u, 1), (36, d, 0)}. In this representation, "d" indicates that the message is passed downstream, from the server to one of the users, while "u," for "upstream," indicates the reverse directionality. One of the users—in this case, User B—is assigned a user-endpoint ID of 0, and the other user is assigned a user-endpoint ID of 1. Assuming that list 41 includes this 5-gram, this sequence may be identified as potentially indicating a relationship between User A and User B.

Typically, when considering whether to identify a given sequence of messages for a particular pair of users, the processor considers the time span of the sequence. In response to this time span being less than a given threshold, the processor may identify the sequence. Typically, this threshold is a function of a number of round trips, between the server and the pair of users, that is implied by the sequence. (In general, each round trip includes an upstream message followed by a downstream message, or vice versa.)

For example, the time span of the five-message sequence described above—i.e., the interval between MSG1 and MSG6—is approximately 3.7 ms. (In practice, typically, the time span of such a sequence would be much larger than 3.7 ms; as noted above, however, the times in FIG. 2 are provided by way of illustration only.) Since this sequence implies two round trips between the server and users A and B, the processor may select a threshold that is appropriate for a two-round-trip sequence, and then compare 3.7 ms to this threshold. If 3.7 ms is less than the threshold (and if the pattern of this sequence matches a predetermined message-sequence pattern), the processor may identify this sequence for user pair (A,B). Otherwise, the processor may ignore this sequence, since the relatively long time span of the sequence indicates that the sequence does not belong to a communication session between User A and User B.

In many cases, the processor may identify a smaller sequence of messages that is subsumed within a larger sequence. For example, in addition to identifying a given 5-gram, the processor may identify a 2-gram, 3-gram, and/or 4-gram that is included in the 5-gram.

It is noted that each message may be characterized by any number of properties, alternatively or additionally to those specified above. Hence, a given sequence may be identified as following one of the predetermined message-sequence patterns by virtue of the respective sizes of the messages in the sequence, the respective directionalities of the messages, the respective user endpoints of the messages, and/or any other properties of the messages. For example, each word in any given n-gram may include, in addition to the size, directionality, and user endpoint of the corresponding message, the time interval between the receipt of the previous message and the receipt of the message. (Thus, for example, MSG4 may be represented by the n-gram (157, d, 1, 0.3228)).

It is further noted that a given predetermined pattern may specify an upper bound, a lower bound, or a range of values for one or more "letters," such that multiple sequences having different respective properties may be deemed to match the same pattern. For example, by way of illustration, the following predetermined pattern may describe the sending of a text message from one user to another user: {(x>MAXSIZE, u, 0), (36, d, 0), (x+/−RANGE, d, 1), (64, u, 1), (36, d, 0)}. To match this pattern, a given sequence requires:

(i) a first message, sent from the first user, whose size "x" is greater than the size MAXSIZE of the largest standard message belonging to the application;

(ii) a second message, received by the first user, whose size matches that of a standard acknowledgement message sent by the server (namely, 36 bytes);

(iii) a third message, received by the second user, whose size is within a given RANGE of "x;"

(iv) a fourth message, sent by the second user, whose size matches that of a standard acknowledgement message sent to the server (namely, 64 bytes); and (v) a fifth message, sent to the first user, whose size matches that of a standard acknowledgement message sent by the server (namely, 36 bytes).

(The above described sequence of MSG1, MSG2, MSG4, MSG5, and MSG6 matches this pattern.)

It is emphasized that the processor does not need to identify the meaning of any particular message, or of any particular sequence. Rather, the processor need only learn the message-sequence patterns that indicate user-pair relationships, and then identify sequences matching these patterns. Hence, a single framework for learning and scanning may be deployed across multiple applications.

Notwithstanding the above, the processor may, in some embodiments, classify particular types of messages, and include the message classification as another letter in the words that represent the messages. (Thus, for example, MSG4 may be represented by the n-gram (157, d, 1, "text")). In classifying messages, the processor may, for example, use any of the transfer-learning techniques described in Israel Patent Application No. 250948, whose disclosure is incorporated herein by reference.

For each identified sequence that matches one of the predefined patterns, the processor increments a counter that is maintained for the corresponding pair of users and for the particular pattern followed by the sequence. The processor thus generates, for each of a plurality of user pairs, a feature vector 44 that includes the count for each of the predetermined patterns. (In some embodiments, to reduce the dimensionality of feature vectors 44, multiple patterns may be grouped together into a "family" of patterns, such that the counts for these patterns are combined into a single feature.)

For example, by way of illustration, FIG. 2 depicts four different predetermined patterns: a two-message pattern "2-gram-0," another two-message pattern "2-gram-1," a three-message pattern "3-gram-0," and another three-message pattern "3-gram-1." (Any one of 2-gram-0, 2-gram-1, 3-gram-0, and 3-gram-1 may alternatively indicate a family of patterns, as explained above.) For each of user pairs (A,B), (A,C), and (A,D), the processor generates a feature vector 44 that includes the respective number of identified sequences following each of these patterns.

Following the generation of feature vectors 44, the processor applies a machine-learned model to feature vectors 44. This model calculates, for each pair of users, a likelihood, or "confidence level," that the pair of users are related to one another, i.e., that the pair of users used the application to communicate with one another, based on the counts contained in the pair's feature vector. (The values of this likelihood measure may be drawn from the range of 0-1, or from any other suitable range.) For example, the machine-learned model may comprise a classifier 46, which, given feature vectors 44, classifies each candidate related pair as "related" or "unrelated," with an associated likelihood.

Typically, the processor divides the full volume of received communication into multiple sub-volumes that each have a predefined time interval (such as 10 minutes), generates a separate set of vectors 44 for each of the sub-volumes, and then separately processes each of these sets, as described above. Thus, for each relevant pair of users, and for each of the sub-volumes, the processor obtains a different respective likelihood of relatedness. The processor then combines the sub-volume-specific likelihoods of relatedness for each pair of users into a combined likelihood of relatedness, referred to hereinbelow as a "score," which may be drawn from any suitable range of values. (This score may be continually updated over time, e.g., over several days or weeks, as further communication is received by the processor.) Each of the calculated scores is compared, by the processor, to a suitable threshold. In response to the score for a particular pair of users exceeding the threshold, the processor generates an output that indicates the particular pair of the users. (Typically, the output also indicates the score for the pair.) For example, the processor may generate a visual output on display 36 showing all pairs of users whose respective scores exceed the threshold, thus reporting these pairs of users as being potentially-related pairs.

Notwithstanding the above, it is noted that for some pairs of users, even a single one of the sub-volumes may provide sufficient evidence of relatedness, i.e., the likelihood of relatedness that is calculated from a single sub-volume may already exceed the threshold.

Screening the Volume for Candidate Related Pairs

Typically, volume 38 includes a large number of messages exchanged, collectively, with a large number of users, such that it is relatively time-consuming to consider all possible pairs of related users. Hence, the processor typically performs a first screening, to identify "candidate" pairs of related users who potentially used the application to communicate with one another. The processor then scans volume 38 for sequences of messages exchanged between the server and any one of the identified candidate related pairs, while generally ignoring other pairs of users who are assumed to be unrelated to one another.

Figure 3:
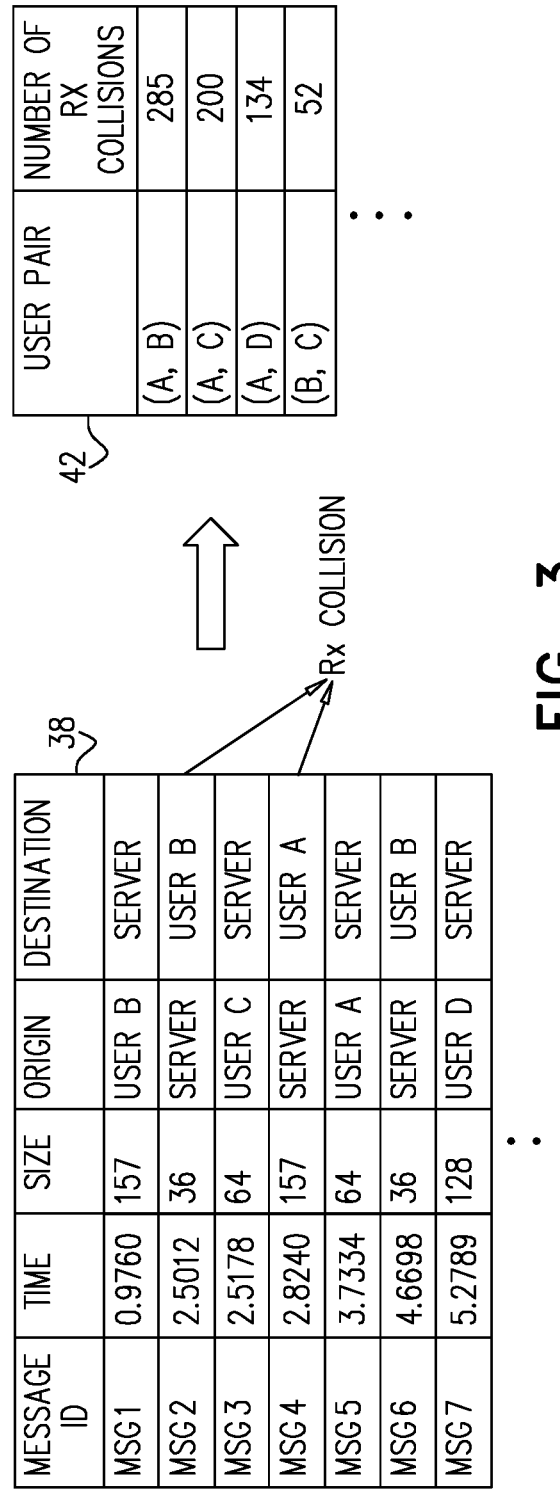
FIG. 3 is a schematic illustration of a technique for identifying candidate pairs of related users, in accordance with some embodiments of the present disclosure.

In this regard, reference is now made to FIG. 3, which is a schematic illustration of a technique for identifying candidate pairs of related users, in accordance with some embodiments of the present disclosure.

Typically, to identify a particular pair of users as a candidate pair of related users, the processor identifies, in volume 38, a plurality of "Rx collisions," i.e., a plurality of instances in which a first downstream message destined to one member of the pair was received within a given time interval (e.g., 1-6 ms, such as 2-3 ms) of a second downstream message destined to the other member of the pair. In some embodiments, to identify the Rx collisions, the processor passes, over volume 38, a sliding window whose duration is equal to the desired Rx-collision time interval and identifies all pairs of downstream messages contained in the sliding window. One such Rx collision is identified in FIG. 2: MSG4, which is destined for User A, is received by the processor (or by the relevant network tap) approximately 0.3 ms after MSG2, which is destined for User B.

Typically, the processor counts the number of Rx collisions for each pair of users, and stores the counts, for example, in a table 42. Subsequently, the processor identifies each pair having an Rx-collision count that is greater than a particular threshold as being a candidate pair of related users. This threshold may be designated, for example, based on the total duration of volume 38, or based on a given percentile of the Rx-collision counts. Alternatively, this threshold may be implicitly designated, in that the processor may sort table 42 in decreasing order of Rx-collision count, and then select the top "M" pairs of users, where M is any suitable number, as candidate pairs. (After a particular pair of users is identified as being related, in that the pair's likelihood of relatedness exceeds the relevant threshold, the processor may ignore any Rx collisions between the pair, such as to make room, in the top M slots in table 42, for other pairs of users who were not yet identified as being related.)

For example, with reference to table 42, the processor may identify each of the pairs (A,B), (A,C), and (A,D), but not the pair (B,C), as a candidate related pair, based on a threshold of, for example, 52 or 100. Subsequently, the processor may scan volume 38 for n-grams belonging to (A,B), (A,C), and (A,D), but not for n-grams belonging to (B,C). Thus, for example, the processor may ignore the 3-gram of MSG1, MSG2, and MSG3, given that the processor already established, by the aforementioned screening process, that the pair (B,C) is likely not related.

In some embodiments, to improve the effectiveness of the screen, the processor counts only Rx collisions that involve downstream messages of particular types (or of particular sizes). Alternatively or additionally to identifying a candidate related pair by counting Rx collisions for the pair, the processor may identify the candidate related pair by identifying "Tx-Rx collisions" for the pair. In other words, the processor may identify instances in which a downstream message destined for one member of the pair was received within a given time interval of an upstream message sent from the other member of the pair.

Learning the Predetermined Message-Sequence Patterns

Figure 4:
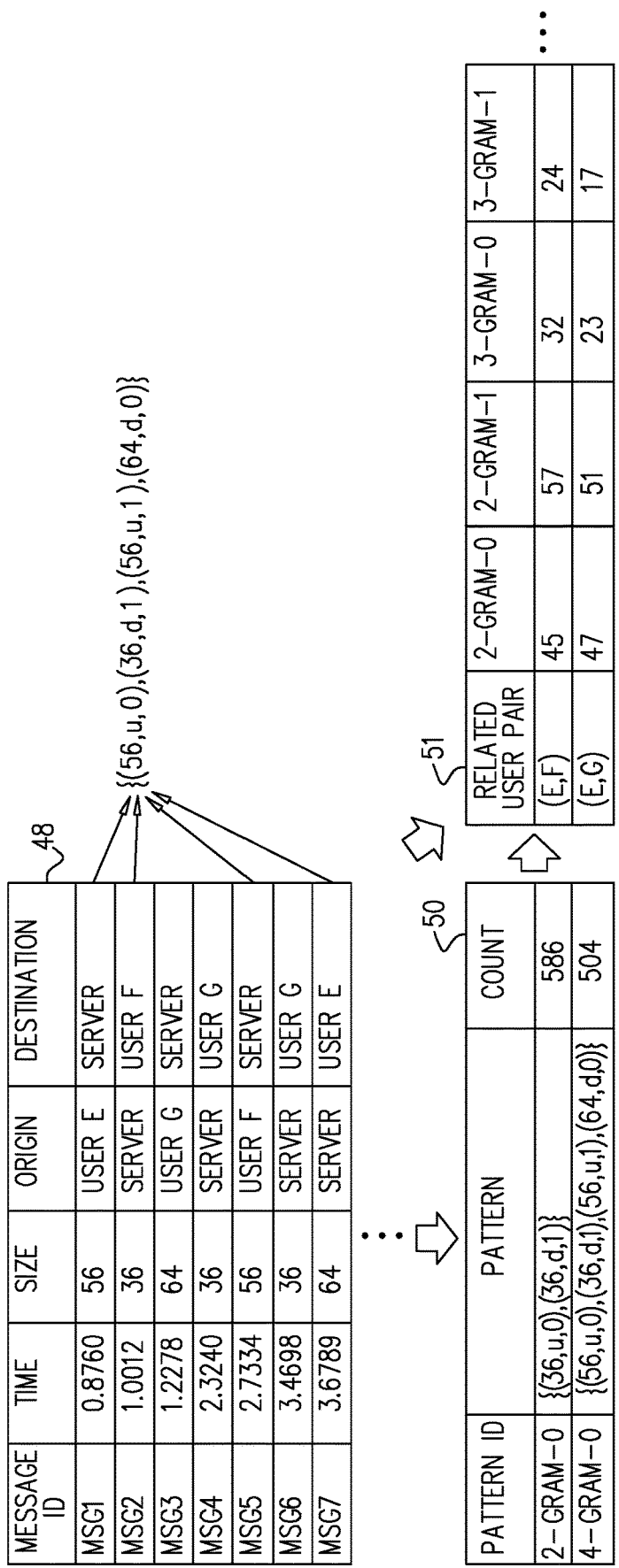
FIG. 4 is a schematic illustration of a technique for learning message-sequence patterns that indicate user-pair relatedness, in accordance with some embodiments of the present disclosure.

Reference is now made to FIG. 4, which is a schematic illustration of a technique for learning message-sequence patterns that indicate user-pair relatedness, in accordance with some embodiments of the present disclosure.

Typically, prior to scanning volume 38 as described above with reference to FIG. 2, processor 30 learns the message-sequence patterns that indicate potential user-pair relatedness, i.e., the processor learns which patterns to include in list 41. The processor learns these patterns by identifying a plurality of message sequences, each of which follows one the patterns and is assumed to belong to a communication session between a pair of users. In other words, the processor learns the message-sequence patterns from communication exchanged between the server and pairs of users that are known (or are at least assumed with sufficient confidence) to have used the application to communicate with one another.

For example, to learn the patterns, the processor may scan another volume 48 of communication traffic that functions as a "learning set," in that volume 48 includes communication sessions between pairs of related users. By scanning volume 48, the processor may identify various message sequences exchanged between the server and these pairs of related users, and hence the patterns that are followed by these sequences. For example, in the specific scenario shown in FIG. 4, the processor identifies a 4-gram, {(56,u,0),(36,d,1),(56,u,1),(64,d,0)}, exchanged between the server and the pair of related users (User E, User F). For every such sequence that is identified, the processor increments a counter for the pattern that is followed by the sequence. The counts are stored, for example, in a table 50. Based on these counts, the processor may identify the most common patterns—i.e., the patterns with the highest associated counts—that were identified in volume 48. For example, the processor may identify the top 100 patterns. These patterns are then included in list 41.

By scanning volume 48, the processor may also generate a ground-truth set 51 of training vectors, which specifies, for each pair of related users, and for each of the patterns in list 41, the number of sequences following the pattern that were observed for the pair. (The vectors in set 51 are thus analogous to feature vectors 44, described above with reference to FIG. 2.) These training vectors are used to train classifier 46, as further described below. Typically, volume 48 is divided into a plurality of sub-volumes, each having a standard, predefined time span (such as 10 minutes), and ground-truth training vectors are generated from each of the sub-volumes. Hence, set 51 may include a plurality of training vectors for any particular pair of users.

In some embodiments, volume 48 is expressly generated for learning the meaningful message-sequence patterns. For example, two or more users may deliberately perform various exchanges of communication with each other, such as to generate a variety of different message sequences. Alternatively or additionally, processor 30 may perform various exchanges of communication between automated user profiles. (For example, User E and User F, shown in FIG. 4, may be automated user profiles used by the processor to exchange communication.) This communication is then scanned by the processor, such as to identify the various message-sequence patterns that are indicative of potential user-pair relatedness.

Alternatively or additionally, the processor may learn the message-sequence patterns from a volume of communication traffic that was not expressly generated for learning purposes. In such embodiments, the processor first identifies at least one ground-truth pair of related users, i.e., at least one pair of users who are assumed, with sufficient confidence, to be related to one another, such that the processor may subsequently identify various message-sequence patterns from the traffic of this pair. Further to identifying any given ground-truth pair, the processor may assume that any sequence exchanged with the pair belongs to a communication session between the pair.

In some embodiments, the aforementioned ground-truth pairs are identified from an information source other than the traffic generated by the application of interest. For example, via network taps 32, the processor may monitor Voice over IP (VoIP) communication, or any other peer-to-peer communication over network 22, such as to identify a pair of users who communicate with one another relatively frequently. Alternatively or additionally, ground-truth pairs may be identified by monitoring other communication sessions that are not exchanged over network 22, such as phone conversations or Short Message Service (SMS) sessions. Alternatively or additionally, ground-truth pairs may be identified from other information sources, such as contact lists.

Alternatively or additionally, the processor may identify ground-truth related pairs by applying the screening technique described above with reference to FIG. 3. For example, if a particular pair of users shows a sufficiently large number of Rx collisions, the processor may assume that this pair is related, and may hence assume that any sequence of messages exchanged with this pair belongs to a communication session between the pair. (Typically, when using this technique to identify ground-truth related pairs, the processor applies a threshold to the Rx-collision count that is higher than the above-described threshold for identifying candidate pairs of related users.)

Generating Training Vectors for Pairs of Unrelated Users

Figure 5:
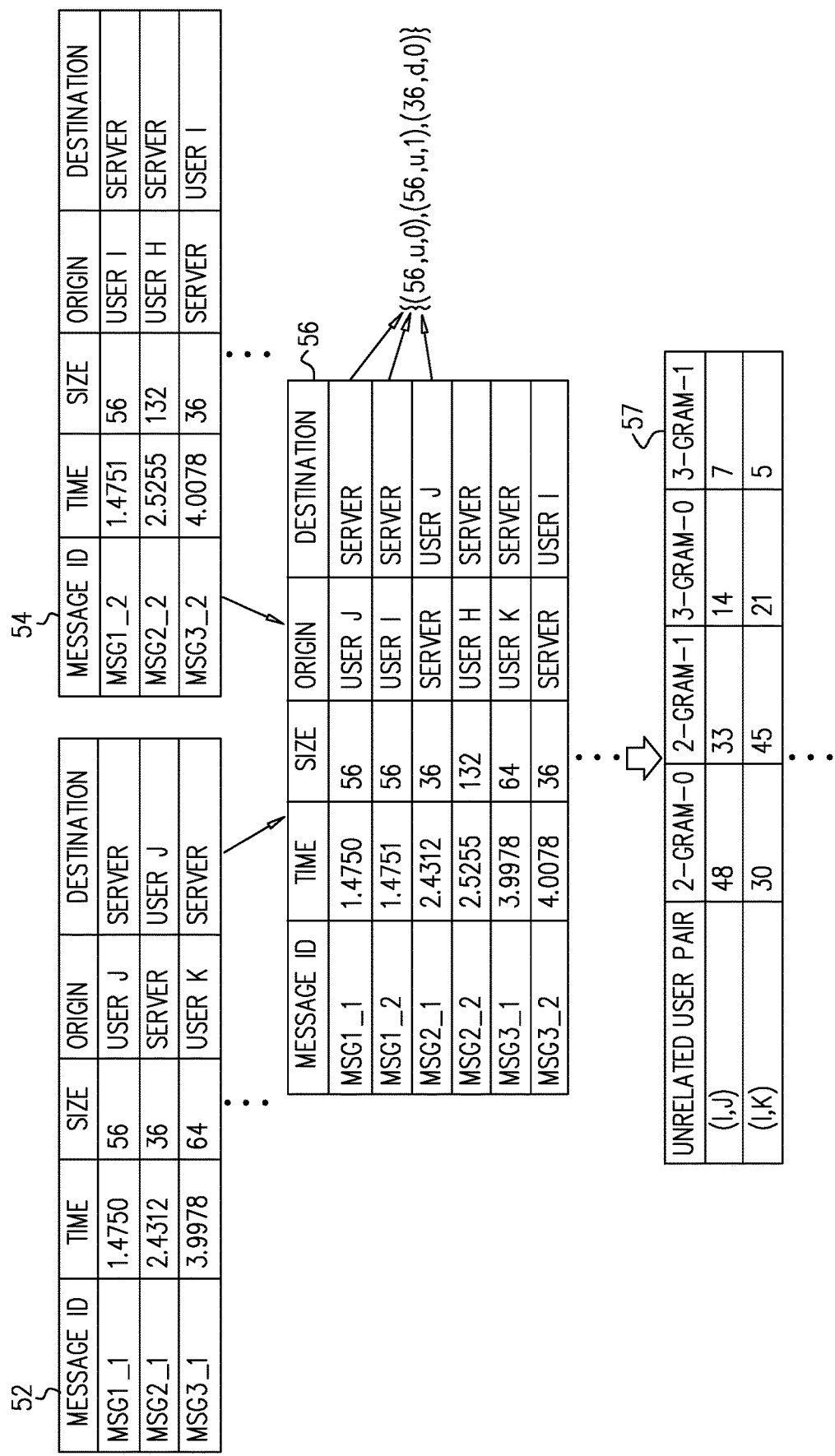
FIG. 5 is a schematic illustration of a technique for generating a set of training vectors for pairs of unrelated users, in accordance with some embodiments of the present disclosure.

Reference is now made to FIG. 5, which is a schematic illustration of a technique for generating a set 57 of training vectors for pairs of unrelated users, in accordance with some embodiments of the present disclosure. Set 57 is used, together with set 51 (FIG. 4), to train classifier 46 to distinguish between related and unrelated pairs.

Typically, to generate set 57, the processor first generates "spurious" message sequences, each of which is known not to belong to any communication session. For example, the processor may generate a synthetic volume 56 of communication traffic, by intermixing a first sequential series 52 of messages exchanged with the server with a second sequential series 54 of messages exchanged with the server. For example, the processor may intermix a first volume of traffic obtained from network taps 32 with a second volume generated by automatic user profiles. As another example, the processor may intermix two volumes of communication traffic obtained from network taps 32 over two different time periods. This intermixing creates a plurality of spurious message sequences, each of which includes at least one message from first series 52 and at least one message from second series 54.

When intermixing the two series of messages, the receipt times of one of the series are "normalized" with respect to the receipt times of the other series, so that the resulting synthetic volume includes an intermingling of messages from the two series, as if the two series were received over the same time period. For example, in FIG. 5, the receipt times of second series 54 are normalized with respect to those of first series 52, in that the first message (MSG1_2) in second series 54 is assigned a receipt time that is approximately equal to that of the first message (MSG1_1) in first series 52.

Subsequently, by scanning volume 56, the processor identifies the spurious sequences in volume 56, and the patterns followed by these sequences. For each identified pattern that is contained in list 41 (FIG. 2), the processor increments a counter for the pattern and for the corresponding user pair. The processor thus generates set 57, which includes all of the relevant counts.

For example, FIG. 5 shows a spurious sequence of MSG1_1, MSG1_2, and MSG2_1, which appears to be exchanged between the user pair (I,J), but is spurious by virtue of including at least one message from each of the original series. As further indicated in FIG. 5, this sequence follows the pattern {(56,u,0),(56,u,1),(36,d,0)}. Hence, assuming that this pattern is included in list 41, the processor may increment the count for user pair (I,J) and for the pattern {(56,u,0),(56,u,1),(36,d,0)}.

Typically, volume 56 is divided into a plurality of sub-volumes, each having a standard, predefined time span (such as 10 minutes), and ground-truth training vectors are generated from each of the sub-volumes.

It is noted that synthetic volume 56 may also be used to exclude meaningless patterns from list 41, in that, if a given pattern is followed relatively frequently by the spurious sequences in volume 56, the processor may exclude the pattern from list 41. For example, for each candidate pattern, the processor may calculate the frequency with which the pattern appears in the "true" sequences of volume 48 (FIG. 4), relative to the frequency with which the pattern appears in the spurious message sequences of volume 56. Each of the true sequences and spurious sequences may be referred to as a "ground-truth sequence," in that the sequence is known to belong to either a related pair or an unrelated pair. For example, assuming that volume 48 and volume 56 are of approximately equal size, the processor may compare $N_T$, the number of times the pattern is followed by any true message sequence in volume 48, to $N_S$, the number of times the pattern is followed by any spurious message sequence in volume 56. Thus, for example, if $N_T$-$N_S$ is greater than a threshold, the processor may include the pattern in the predetermined message patterns of list 41; otherwise, the processor may exclude the pattern. In the event that the two volumes are of different sizes, a function that accounts for the different sizes, such as a log-likelihood function, may be used to ascertain, based on $N_T$ and $N_S$, whether to include the pattern.

Notwithstanding the above, it is noted that the processor may learn the most common message-sequence patterns (as described above with reference to FIG. 4) without attempting to exclude any meaningless patterns, since, in any event, classifier 46 is trained to identify the most meaningful patterns, as described below.

It is noted that if series 52 and/or series 54 includes known communication sessions, the processor may also identify true sequences in synthetic volume 56, such that the processor may use volume 56 to learn the patterns that are to be included in list 41, and to generate set 51 (FIG. 4). (It is further noted that the same users may appear in both series 52 and series 54, such that a particular pair of users may be "related" with respect to true sequences that are contained entirely in series 52 or series 54, but "unrelated" with respect to spurious sequences that combine messages from series 52 with messages from series 54.)

Training the Classifier

Subsequently to (i) learning the predetermined message-sequence patterns and generating a set of training vectors for pairs of related users from ground-truth true message sequences, as described above with reference to FIG. 4, and (ii) generating a set of training vectors for pairs of unrelated users from ground-truth spurious message sequences, as described above with reference to FIG. 5, the processor trains a model, using both sets of training vectors. For example, the processor may train classifier 46 using logistic regression, random forests, neural networks, or any other suitable supervised machine learning algorithm. As described above with reference to FIG. 2, this model is then used to identify new pairs of related users. In some embodiments, the processor continually retrains the model, using data from pairs of users that the model identified, with a high level of confidence, as being related or unrelated. In doing so, the processor may use any suitable online machine learning techniques.

It is noted that each of the training vectors used to train the model may include any suitable features, alternatively or additionally to the numbers of identified sequences. (Hence, these features may also be used subsequently to the training, to identify new pairs of related users.) Advantageously, at least some of these features may be relevant across different applications; in other words, at least some of these features may help discriminate between related pairs and unrelated pairs, regardless of the application for which these features are used.

For example, each of the training vectors may include the number of unique time windows having at least one sequence following one of the predetermined patters. (Each time window may have any suitable duration, such as, for example, one second.) Alternatively or additionally, each training vector may include one or more other features that are based on the timing of the identified sequences, and/or the distribution of the sequences over time. In general, a more uneven distribution indicates that the sequences belong to a communication session (and hence, that the users are related to one another), whereas a more even distribution indicates the sequences are spurious (and hence, that the users are not related).

As another example, even features that do not necessarily relate to any identified sequences per se may be included in the training vectors. One such feature is the ratio of the number of messages sent from one of the users to the number of messages sent from the other user. In general, a ratio that is close to one indicates that the pair is related, whereas a ratio that is further from one indicates that the pair is unrelated. Another such feature is the number of Tx-Rx collisions in which the two temporally-colliding messages share the same size, or have respective sizes differing by a known, fixed offset. (One such collision is included in volume 38 (FIGS. 2-3), whereby User B sends the server a message (MSG1) having a size of 157 bytes, and then User A receives a message (MSG4) that also has a size of 157 bytes.) In general, a large number of such collisions indicates user-pair relatedness.

In some embodiments, each feature vector is normalized by the number of messages contained in the sub-volume from which the vector was derived, or by the time span of this sub-volume. In such embodiments, the sub-volume time span used for generating vectors 44 (FIG. 2) need not necessarily be the same as the sub-volume time span used for generating the training vectors. Moreover, the processor need not necessarily use the same time span for all of vectors 44, or the same time span for all of the training vectors.

For example, classifier 46 may be trained on sets of training vectors derived from 10-minute sub-volumes. Subsequently, the processor may generate vectors 44 from 20-minute sub-volumes, each of which contains approximately twice as many messages as a typical 10-minute sub-volume. Prior to passing vectors 44 to the classifier, the processor may normalize vectors 44 by dividing each of these vectors by two, since the count for any given pattern in a 20-minute volume is expected to be twice as high as the count in a 10-minute volume. (In some cases, normalization may not be needed, even if the time spans differ from one another. For example, a one-hour sub-volume of midnight traffic may contain approximately as many messages as a 10-minute sub-volume of midday traffic, such that a vector derived from the one-hour midnight sub-volume may be passed to a classifier that was trained on 10-minute midday sub-volumes, even without prior normalization of the vector.)

In some applications, such as Telegram, messages of varying types may share the same size. Even for such applications, however, the processor may identify pairs of related users, based on the identification of higher-order n-grams (e.g., 5-grams or 6-grams), message ratios, and/or any other relevant features extracted from the communication.

In some embodiments, the processor identifies, in the ground-truth volume(s), "meta-sequences" of messages (or n-n-grams), each of which follows a "meta-pattern." For example, while a first user uses a particular messaging app to type a text message to a second user, the messaging app may send a "typing" message to the second user, which indicates that the first user is typing. This typing message, along with any associated acknowledgement messages, constitutes a first message sequence. Subsequently, when the first user sends the message, a second message sequence may be generated. The first sequence, together with the second sequence, constitute a meta-sequence (and in particular, a 2-n-gram) that indicates user-pair relatedness. Thus, the processor may learn the meta-pattern that is followed by this meta-sequence, and then identify pairs of related users by scanning the communication traffic for this meta-pattern.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. Apparatus, comprising:
a network interface; and
a processor, configured to:
receive a volume of communication traffic that includes a plurality of messages, each of which is exchanged between a server for an application and one of a plurality of users, wherein each message of the plurality of messages is encrypted,
by scanning the encrypted messages of the plurality of messages for any message sequence that follows any one of a plurality of predetermined message-sequence patterns, identify, in the received volume, at least one sequence of messages that is exchanged between the server and a particular pair of the users, and follows one of the predetermined message-sequence patterns,
in response to the identifying, calculate a likelihood that the particular pair of the users used the application to communicate with one another, and
in response to the likelihood exceeding a threshold, generate an output that indicates the particular pair of the users, wherein the encrypted messages of the plurality of messages are scanned without decrypting any of the encrypted messages, wherein the processor is configured to identify the sequence in response to the sequence spanning a time interval that is less than a given threshold.

2. The apparatus according to claim 1, wherein the processor is configured to scan the encrypted messages of the plurality of messages for any message sequence that follows any one of the predetermined message-sequence patterns by virtue of a property of the message sequence selected from the group of properties consisting of: respective sizes of messages in the message sequence, respective directionalities of the messages in the message sequence, and respective user-endpoints of the messages in the message sequence.

3. The apparatus according to claim 1, wherein the processor is further configured to, prior to scanning the encrypted messages of the plurality of messages, identify multiple pairs of the users that potentially used the application to communicate with one another, the multiple pairs including the particular pair, by identifying in the volume of traffic, for each pair of the multiple pairs, a plurality of instances in which a first one of the messages destined to a first member of the pair was received within a given time interval of a second one of the messages destined to a second member of the pair, and
wherein the processor is configured to scan the received volume for any message sequence exchanged between the server and any one of the identified multiple pairs of the users.

4. The apparatus according to claim 1, wherein the given threshold is a function of a number of round trips, between the server and the particular pair of users, that is implied by the sequence.

5. The apparatus according to claim 1,
wherein the processor is configured to identify a plurality of sequences that collectively follow a plurality of different ones of the predetermined message-sequence patterns, and
wherein the processor is configured to calculate the likelihood, using a machine-learned model, based at least on respective numbers of the identified sequences following the different ones of the predetermined message-sequence patterns.

6. The apparatus according to claim 5, wherein the volume is a first volume, and wherein the processor is further configured to:
identify a plurality of true message sequences, each of which follows any one of the predetermined message-sequence patterns and is assumed to belong to a communication session between any two users,
generate a second volume of communication traffic, by intermixing a first sequential series of messages exchanged with the server with a second sequential series of messages exchanged with the server,
identify, in the second volume, a plurality of spurious message sequences, each of which follows any one of the predetermined message-sequence patterns and includes at least one message from the first sequential series and at least one message from the second sequential series, and
train the model, using both the true message sequences and the spurious message sequences.

7. The apparatus according to claim 1, wherein the processor is further configured to, prior to scanning the encrypted messages of the plurality of messages, learn the message-sequence patterns, by identifying a plurality of ground-truth message sequences, each of which follows any one the message-sequence patterns and is assumed to belong to any one of a plurality of communication sessions between one or more other pairs of users.

8. The apparatus according to claim 7, wherein the processor is further configured to ascertain that each one of the ground-truth message sequences is assumed to belong to one of the communication sessions, by identifying, for each pair of the other pairs of users, a plurality of instances in which a first message destined to a first member of the pair was received within a given time interval of a second message destined to a second member of the pair.

9. The apparatus according to claim 7,
wherein the volume is a first volume,
wherein the processor is further configured to:
generate a second volume of communication traffic, by intermixing a first sequential series of messages exchanged with the server with a second sequential series of messages exchanged with the server, and
identify, in the second volume, a plurality of spurious message sequences, each of which includes at least one message from the first sequential series and at least one message from the second sequential series, and
wherein the processor is configured to, in learning the predetermined message-sequence patterns, exclude at least some patterns followed by the spurious message sequences from the predetermined message-sequence patterns, in response to identifying the spurious message sequences.

10. A method, comprising:
receiving a volume of communication traffic that includes a plurality of messages, each of which is exchanged between a server for an application and one of a plurality of users wherein each message of the plurality of messages is encrypted;
by scanning the encrypted messages of the plurality of messages for any message sequence that follows any one of a plurality of predetermined message-sequence patterns, identifying, in the received volume, at least one sequence of messages that is exchanged between the server and a particular pair of the users, and follows one of the predetermined message-sequence patterns;
in response to the identifying, calculating a likelihood that the particular pair of the users used the application to communicate with one another; and
in response to the likelihood exceeding a threshold, generating an output that indicates the particular pair of the users, wherein the encrypted messages of the plurality of messages are scanned without decrypting any of the encrypted messages, wherein identifying the sequence comprises identifying the sequence in response to the sequence spanning a time interval that is less than a given threshold.

11. The method according to claim 10, wherein scanning the received volume comprises scanning the encrypted messages of the plurality of messages for any message sequence that follows any one of the predetermined message-sequence patterns by virtue of a property of the message sequence selected from the group of properties consisting of: respective sizes of messages in the message sequence, respective directionalities of the messages in the message sequence, and respective user-endpoints of the messages in the message sequence.

12. The method according to claim 10, further comprising, prior to scanning the encrypted messages of the plurality of messages, identifying multiple pairs of the users that potentially used the application to communicate with one another, the multiple pairs including the particular pair, by identifying in the volume of traffic, for each pair of the multiple pairs, a plurality of instances in which a first one of the messages destined to a first member of the pair was received within a given time interval of a second one of the messages destined to a second member of the pair,
wherein scanning the received volume comprises scanning the received volume for any message sequence exchanged between the server and any one of the identified multiple pairs of the users.

13. The method according to claim 10, wherein the given threshold is a function of a number of round trips, between the server and the particular pair of users, that is implied by the sequence.

14. The method according to claim 10,
wherein identifying the at least one sequence comprises identifying a plurality of sequences that collectively follow a plurality of different ones of the predetermined message-sequence patterns, and
wherein calculating the likelihood comprises calculating the likelihood, using a machine-learned model, based at least on respective numbers of the identified sequences following the different ones of the predetermined message-sequence patterns.

15. The method according to claim 14, wherein the volume is a first volume, and wherein the method further comprises:
identifying a plurality of true message sequences, each of which follows any one of the predetermined message-sequence patterns and is assumed to belong to a communication session between any two users;
generating a second volume of communication traffic, by intermixing a first sequential series of messages exchanged with the server with a second sequential series of messages exchanged with the server;
identifying, in the second volume, a plurality of spurious message sequences, each of which follows any one of the predetermined message-sequence patterns and includes at least one message from the first sequential series and at least one message from the second sequential series; and
training the model, using both the true message sequences and the spurious message sequences.

16. The method according to claim 10, further comprising, prior to scanning the encrypted messages of the plurality of messages, learning the message-sequence patterns, by identifying a plurality of ground-truth message sequences, each of which follows any one the message-sequence patterns and is assumed to belong to any one of a plurality of communication sessions between one or more other pairs of users.

* * * * *